United States Patent Office 3,265,631
Patented August 9, 1966

3,265,631
GUM GEL COMPOSITIONS AND COMPOSITIONS AND PROCESSES FOR THEIR PRODUCTION
Wesley A. Jordan, Minneapolis, Minn., assignor to General Mills, Inc., a corporation of Delaware
No Drawing. Filed Oct. 10, 1961, Ser. No. 144,040
16 Claims. (Cl. 252—316)

This invention relates to gum gels and the process or method for providing such gels, and in particular, to gum gels of mannan gums and litharge.

The mannan gums are naturally occurring polysaccharides which, upon hydrolysis, yield mannose sugar. Gums belonging to the mannan group are the galactomannan gums such as guar gum, carob, flame tree, tara and the like, and glucomannan gums such as *Iles mannan*, konjak and the like.

It has now been discovered that when a mannan gum, such as guar gum, and litharge, is dry blended and this mixture is added to water, a sol forms which later transforms into a gel. Depending upon the ratio of litharge to gum, the gels vary in properties from being very soft and mobile to being firm and rigid. The rigid gels do not have cold flow, and once they are formed, they remain as such so that if these gels are fragmentized, they do not coalesce into a continuous, homogeneous solid. Such rigid gels do not melt when heated to 100° C. In some instances, the soft litharge gels may coalesce upon being fragmentized.

These properties make the mannan gum-litharge gel of interest in several industrial applications. For example, the rigid gels may be used as a lost circulation material in drilling operations for plugging and filling crevices or fissures in formations where the drilling fluid is lost.

Other industrial applications will be apparent and described in the detailed description to follow.

Gels formed by the addition of borax to guar or carob gum sols are known in the art. These gels are formed through the mechanism of hydrogen bonding. When these gels are separated into several portions and then mixed together the collected portions of gels will coalesce into a homogeneous mass. In general, mannan gumborax gels exhibit cold flow. When these gels are placed on a flat surface, they will spread out over a large area. In contrast thereto, the rigid litharge-mannan gel complexes of the present invention do not show cold flow. When the rigid type gels of the present invention are formed in a container, they assume the shape of the container and will retain this shape even when removed. Thus, in applications where rigidity and firmness are required, these gels will have considerable commercial value. Such applications are in plugging fissures or bonding and binding solids for making molded objects.

Guar gums dispersed in water will form a sol without heating the mixture. This property in guar gum is unique and further distinguishes guar from most of the other mannan gums. However, if borax is preblended with guar gum, this mixture will not yield a sol when added to cold water. The borax in such instances has an inhibiting effect on gum swelling. If guar is first blended with borax before dispersing the mixture in water, heat is required to form a sol, which sol, upon cooling, yields a gel. Thus, borax-guar gel preparation requires either the making of a sol first before adding borax or the heating of the dispersion when both components are dispersed simultaneously. In contrast thereto, litharge does not inhibit gum swelling. In addition to the borax-mannan gum gels, other gum gels are known, for example, a mixture of tannin with carob gum when dispersed in water and heated with agitation to 80° and subsequently cooled to 25° C. without agitation yields a semi-rigid gel. Such gels, however, are brittle and break into fragments easily. Thus, the strength of these gels is much less than that of the rigid gels obtained from the mixture of guar gum and litharge. Furthermore, when the tannin carob gels are heated, they melt at temperatures of 60–70° C. whereas the gels of the present invention show no change when heated to 100° C.

It is therefore an object of this invention to provide novel mannan gum gels.

It is also an object of this invention to provide a litharge-mannan gum gel.

It is also an object of this invention to provide a method of preparing litharge-mannan gum gels.

It is also an object of this invention to provide a one-package litharge-mannan gum mixture which may be dispersed in an aqueous medium to form a gel.

Accordingly, the present invention deals with compositions containing litharge and mannan gums. The litharge and mannan gum sol complex to form a gel. These gels may be formed in a number of ways. The gum and litharge may be preblended before dispersing in water or the gum sol may be formed first and litharge added later. It is preferred, however, to preblend the gum and litharge before dispersing in water. When a blend of litharge and gum is dispersed in water a sol is first formed which continues to gain viscosity until the sol transforms to a gel.

As previously indicated, the mannan gums which may be employed in this invention are the galactomannan gums such as guar gum, carob gum, flame tree, tara, and the like, and the glucomannan gums such as *Iles mannan*, konjak and the like. The amount of litharge which should be employed must generally be sufficient to cross link the hydrated guar molecules. In addition, the amount of the mixture in the sol should generally be 0.25% or more by weight. In general, the litharge will be used in excess of 1% by weight based on the total amount of litharge and gum.

The invention may be better illustrated by means of the following examples in which all "parts" and "percentages" are by weight unless otherwise noted. These examples are given to demonstrate the versatility of the process of making gels and should not be considered as defining the limitations for producing gels. Furthermore, the following examples describing the properties of the gels and their uses are given only to state their value and should not be construed to be limited to the industrial applications cited.

*Examples 1–10*

Nine blends were made containing litharge and guar gum. The percent litharge, PbO, in each respective blend was 2%, 3%, 4%, 5%, 6%, 8%, 10%, 15% and 20%; the balance being guar gum. Using 600 ml. beakers, 9 sols were made, one from each blend by dispersing 4 g. of blend in 396 g. of (25° C.) water being agitated. After the blend was dispersed, agitation was continued for five minutes and stopped. The viscosity of each slurry was measured 15 minutes after adding the blend to water and at one hour periods thereafter. The following table shows the viscosity of each blend and notes the transformations of sols to gels. Viscosity measurement was made with a Brookfield (Syncro-Lectric) Viscometer using a #3 spindle at 20 r.p.m.

| Example No. | Blend Percent PbO | Percent Guar | Viscosity (cps.) After— | | | | | |
|---|---|---|---|---|---|---|---|---|
| | | | 15 Min. | 1 Hr. | 2 Hrs. | 3 Hrs. | 4 Hrs. | 5 Hrs. |
| 1 | 2 | 98 | 1,600 | 2,500 | 2,700 | 2,900 | 3,150 | gel |
| 2 | 3 | 97 | 1,600 | 2,250 | 2,250 | 2,750 | gel | |
| 3 | 4 | 96 | 1,600 | 2,250 | 2,900 | gel | | |
| 4 | 5 | 95 | 1,500 | 2,200 | 3,850 | gel | | |
| 5 | 6 | 94 | 1,500 | 2,200 | gel | | | |
| 6 | 8 | 92 | 1,400 | 2,100 | gel | | | |
| 7 | 10 | 90 | 1,150 | 1,850 | gel | | | |
| 8 | 15 | 85 | 1,150 | gel | | | | |
| 9 | 20 | 80 | gel | | | | | |

The gels made with a blend containing 5% litharge or more were all firm and rigid, while those with less than 5% were soft and rubbery.

The strength of the gels which were firm and rigid was measured by determining the penetration resistance value of each gel after it had aged 94 hours.

The instrument used to measure penetration was a Precision Penetrometer, equipped with a cone which measured 2.5 cm. x 4.5 cm. The weight of cone plus guide rod was 67.8 g. The gel was centered under the cone with the cone point touching the gel surface. When the drop lock was released the cone penetrated the gel. Force was applied for 15 sec.

In Table I is recorded the penetration of the gels in Examples 4 through 9.

TABLE I

| Gel of Example | Solids in Gel Contains— | Mm. Penetration in 15 Sec. |
|---|---|---|
| 4 | 5% PbO, 95% guar | 37.5 |
| 5 | 6% PbO, 94% guar | 33.3 |
| 6 | 8% PbO, 92% guar | 28.8 |
| 7 | 10% PbO, 90% guar | 24.7 |
| 8 | 15% PbO, 85% guar | 18.0 |
| 9 | 20% PbO, 80% guar | 20.3 |

It was discovered that the guar-litharge blends developed sols in near saturated NaCl solution. Of specific interest was a gel made from a blend containing 94% guar gum and 6% litharge dispersed in 20% NaCl solution. Example 11 gives the details thereof.

*Example 11*

Sixteen g. of a blend containing 94% guar gum and 6% litharge was added to 400 cc. of 20% NaCl solution while the salt water was being agitated at slow speed in a Waring Blendor. After two minutes of agitation the mixture was poured into a 400 ml. beaker and allowed to stand 16 hours. The gel formed was very tough and rubbery and withstood in excess of 10 p.s.i. pressure, as applied between two flat surfaces, without breaking or becoming permanently distorted.

It was found that the PbO-guar gum blend containing 6% litharge had excellent sand binding properties. Example 12 describes an experiment showing this property.

*Example 12*

Two g. of a blend containing 94% guar gum and 6% PbO was dry blended with 98 g. of dry sand. After blending, the mixture was moistened with 50 cc. of water and the wet mixture was packed into a paper cup.

After two hours, the cup was torn away and the molded sand was allowed to dry 16 hours. The final product was a solid rigid block of sand bonded with the guar-PbO complex.

The blend used in Example 12 thus has utility in the foundry industry as a core binder in which baking for the purpose of setting up the core may be eliminated. This blend may also be used as a grouting material.

The soft gels developed from blends 1 to 5, when coated onto porous surfaces and dried, produce a tough water resistant finish. These blends thus have utility in protective coating applications.

The reaction between carob gum and litharge yields the same type product as when guar gum is used. Example 13 describes a gel made with carob gum sol.

*Example 13*

Two g. of carob gum was dispersed in 198 g. of cold water, the water being agitated while the gum was added. Agitation was continued while the mixture was heated to 80° C. A sol formed and the sol was cooled to 25° C. While vigorously agitating the sol in a Waring Blendor, 1 g. of powdered litharge was added. The contents were poured into a beaker and observed for 1 hour. A gel similar to the rigid gels produced with guar gum and litharge formed.

*Example 14*

*Iles mannan* gum was made into a gel as follows: 2 g. of *Iles mannan* gum was dispersed in 100 cc. of cold water. While employing agitation, the mixture was heated to 80° C. After cooling the sol to 30° C. a slurry containing 2 g. of litharge in 50 cc. of water was added to the sol and stirred in. A soft rubbery gel formed immediately.

This shows that litharge gels are formed with a glucomannan as well as a galactomannan gum.

It is to be understood that this invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows:

1. A gel composition consisting essentially of a gum selected from the group consisting of galactomannan and glucomannan gums and litharge said litharge being present in an amount sufficient to crosslink said gum.

2. A gel composition as defined in claim 1 in which said gum is a galactomannan gum.

3. A gel composition as defined in claim 1 in which said gum is guar gum.

4. A gel composition as defined in claim 1 in which said gum is carob gum.

5. A gel composition as defined in claim 1 in which said gum is a glucomannan gum.

6. A gel composition as defined in claim 1 in which said gum is *Iles mannan* gum.

7. A process of preparing a gel comprising dispersing in an aqueous medium a gum selected from the group consisting of galactomannan and glucomannan gums and a sufficient amount of litharge to crosslink said gum.

8. A process of preparing a gel as defined in claim 7 in which said gum is guar gum.

9. A process of preparing a gel as defined in claim 7 in which said gum is carob gum.

10. A process of preparing a gel as defined in claim 7 in which said gum is Iles gum.

11. A process of preparing a gel comprising dispersing a gum selected from the group consisting of galactomannan and glucomannan gums in an aqueous medium to form a sol and adding litharge to said sol in an amount sufficient to crosslink said gum.

12. A process of preparing a gel comprising blending a gum selected from the group consisting of galactomannan and glucomannan gums and litharge in an amount sufficient to crosslink said gum and subsequently dispersing said blend in an aqueous medium.

13. A composition for producing a gel upon dispersion in an aqueous medium consisting essentially of a mixture of a gum selected from the group consisting of galactomannan and glucomannan gums and litharge in an amount sufficient to crosslink said gum upon dispersion in said aqueous medium.

14. A gel producing composition as defined in claim 13 in which said gum is guar gum.

15. A gel producing composition as defined in claim 13 in which said gum is carob gum.

16. A gel producing composition as defined in claim 13 in which said gum is *Iles mannan* gum.

References Cited by the Examiner

UNITED STATES PATENTS

| 2,477,544 | 7/1949 | Moe | 252—316 XR |
| 2,678,280 | 5/1954 | Noyes et al. | 106—38.35 |
| 3,080,355 | 3/1963 | Muller | 260—209 |

ALBERT T. MEYERS, *Primary Examiner.*

JULIUS GREENWALD, *Examiner.*

K. W. VERNON, R. D. LOVERING,
*Assistant Examiners.*